Nov. 13, 1956  E. G. HOOD  2,770,337
DUAL CONTROL MECHANISM
Filed Jan. 3, 1955  2 Sheets—Sheet 1
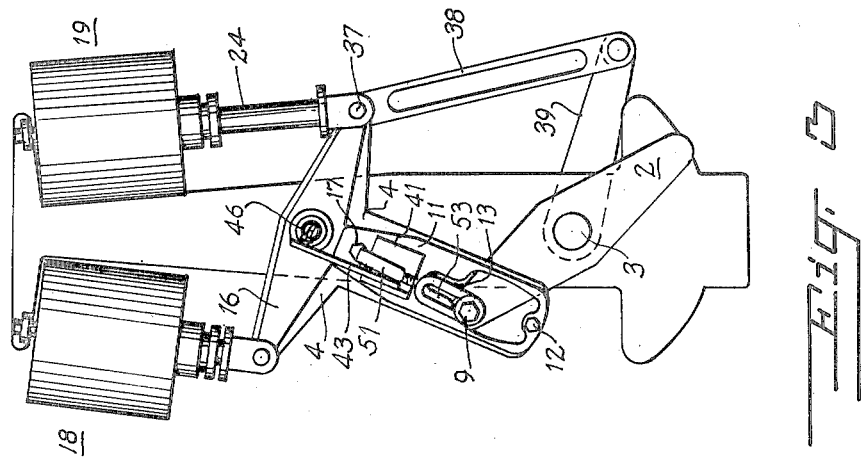
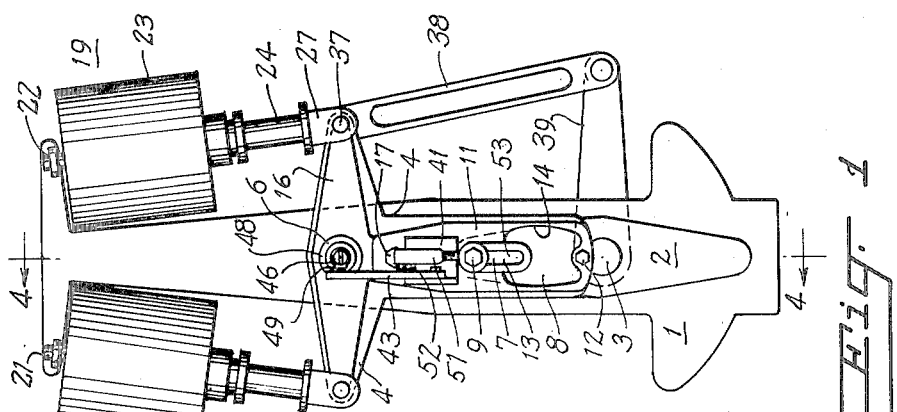
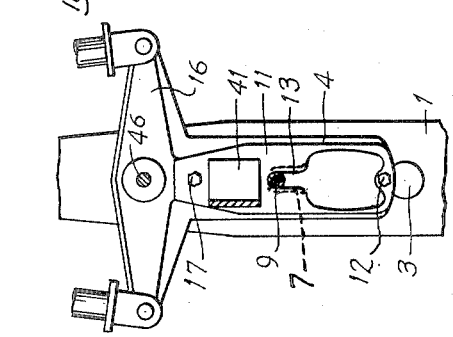
INVENTOR
Edwin G. Hood
BY Howard L. Rose
ATTORNEY Nov. 13, 1956 — E. G. HOOD — 2,770,337
DUAL CONTROL MECHANISM
Filed Jan. 3, 1955 — 2 Sheets-Sheet 2
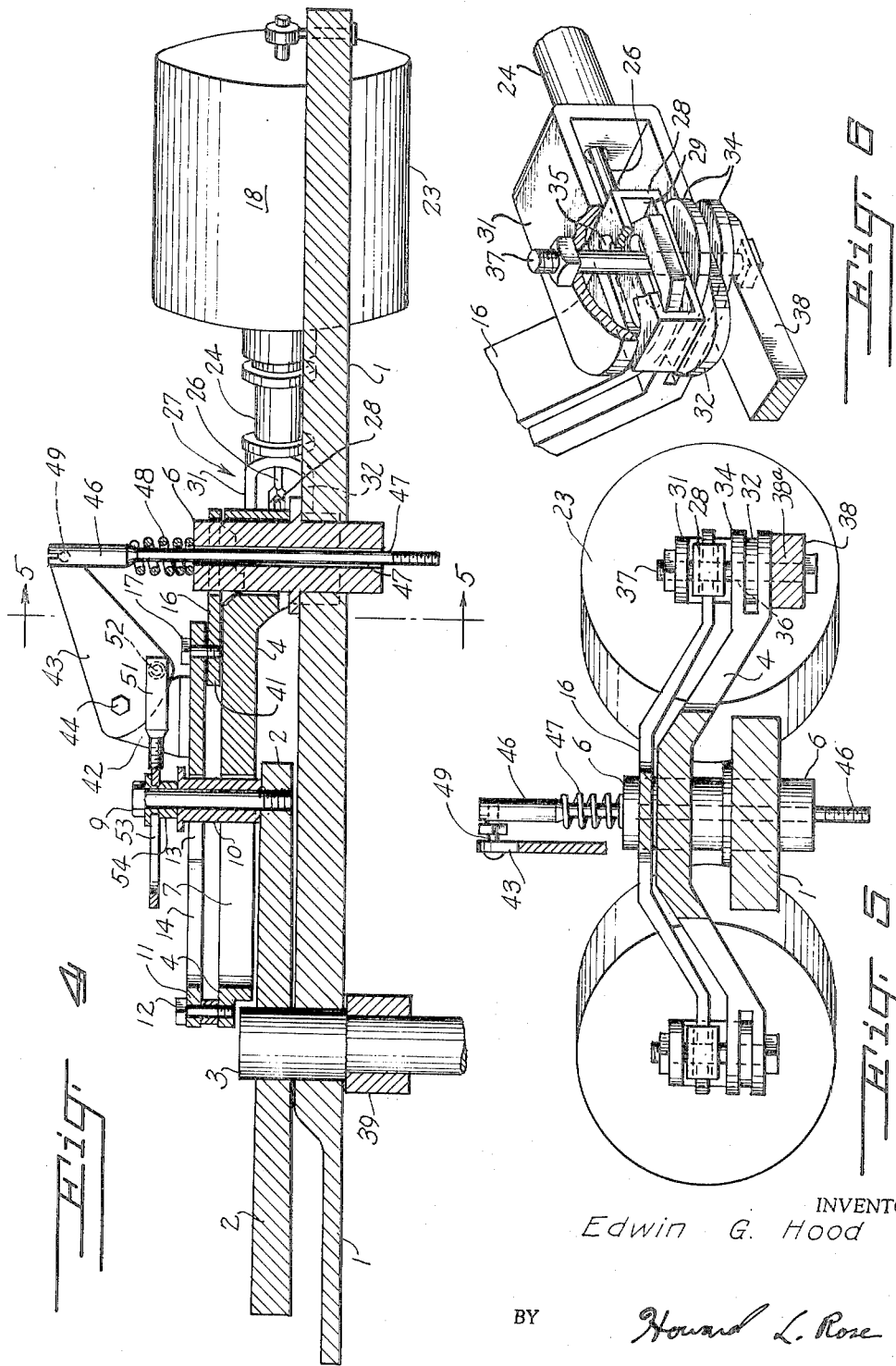
INVENTOR
Edwin G. Hood
BY Howard L. Rose
ATTORNEY

United States Patent Office 2,770,337
Patented Nov. 13, 1956

2,770,337

DUAL CONTROL MECHANISM

Edwin G. Hood, Baltimore, Md.

Application January 3, 1955, Serial No. 479,355

8 Claims. (Cl. 192—.098)

The present invention relates to dual control mechanisms for prime movers and more particularly to a combined throttle and clutch control mechanism for internal combustion engines employed in marine propulsion systems.

It is well known that in marine propulsion systems it is desirable to maintain the prime mover of the propulsion system at idling speed during engagement and disengagement of the clutch and to accelerate the prime mover only after the clutch is engaged. It is further desirable to provide for controlled engagement of the clutch for effecting either ahead or astern movement of the boat and to provide for controlled acceleration of the prime mover upon engagement of the clutch for either direction of movement. The prior art in general provides two distinct types of dual control mechanisms that meet the above conditions. A first type of these mechanisms is a direct acting system employing mechanical linkages connected between a combined throttle and clutch control lever and individual throttle actuating and clutch actuating shafts. A second type of these dual control mechanisms provides for remote control of the throttle actuating and clutch actuating shafts through a hydraulic system selectively actuated in response to movement of the combined throttle and clutch control lever. The difficulty with a remote control system is that if the hydraulic system becomes inoperative all control over the clutch and throttle is lost. On the other hand the difficulty with mechanical linkage systems is that the human operator must supply all of the energy necessary for controlling the propulsion system which in the case of large installations is considerable.

It is, therefore, a primary object of the present invention to provide a simple combined throttle and clutch control mechanism incorporating the advantages of both direct acting and remote control systems.

It is another object of the present invention to provide a combined throttle and clutch control mechanism employing mechanical linkages connected between a combined throttle and clutch control lever and distinct throttle actuating and clutch actuating shafts and to provide a power booster system actuated in response to movement of the combined control lever for effecting movement of the mechanical linkage for actuating the clutch actuating shaft.

Still another object of the present invention is to provide a combined throttle and clutch control mechanism for marine propulsion systems employing individual mechanical linkages for effecting throttle and clutch control in response to movement of a primary control lever and employing a power booster system for effecting movement of the clutch control linkage wherein movement of the clutch control linkage is effected by the primary control lever acting directly on the clutch control linkage only in the event of failure of the power booster system.

Yet another object of the present invention is to provide a combined clutch and throttle control mechanism for internal combustion engines employing a combined control lever and separate mechanical linkages between the combined control lever and clutch actuating and throttle actuating shafts. The mechanism is provided with a power booster system which is connected to the linkage for actuating the clutch control shaft and effects movement of this linkage when the power booster system is actuated. The power booster system is actuated by a predetermined movement of the combined control lever which movement is insufficient to produce a direct application of force by the combined control lever to the clutch control linkage. As a result the force necessary for actuating the clutch is supplied by the booster system entirely. In the event of a failure of the booster system continued movement of the primary control lever causes it to engage the clutch linkage and actuation of the linkage can be effected by the human operator.

The above and still further features, objects, and advantages of the invention will become apparent upon consideration of the following detailed description of a specific embodiment of the invention, especially when taken in conjunction with the accompanying drawings, wherein:

Figure 1 is a view of the front elevation of the combined control mechanism of the invention in the neutral or clutch disengaged position;

Figure 2 is a view of the front elevation of the control mechanism of the present invention with some of the elements of the mechanism eliminated for the sake of clarity;

Figure 3 is a view of the front elevation of the combined control mechanism in the clutch engaged position;

Figure 4 is a cross sectional view taken on line 4—4 of Figure 1;

Figure 5 is a cross sectional view taken on line 5—5 of Figure 4; and

Figure 6 is an exploded perspective view showing a coupling arrangement employed in the mechanism of the present invention.

Referring to Figures 1, 2, and 4 of the accompanying drawings the control mechanism of the present invention is mounted on a substantially flat vertically disposed base member 1 which is elongated along its vertical dimension. A combined throttle and clutch control lever 2 elongated along the same dimension as the base member 1 is positioned parallel to the base member 1 and is located adjacent the lower end thereof. The combined control lever 2 is mounted approximately at its center on a clutch shaft 3 for rotational movement about the shaft 3 in a plane parallel to the base member 1. The shaft 3 extends through the base member 1 in which it is rotatably mounted. A vertically disposed T-shaped clutch control lever 4 is positioned parallel to both the base member 1 and the combined control lever 2 with the cross-arm of the T perpendicular to the elongated dimension of the base member 1. The cross-arm of the T-shaped clutch control lever 4 is located above the combined control lever 2 and the leg of the T-shaped member 4 extends downwardly from the cross-arm to a point adjacent the shaft 3, the upper section of the combined control lever 2 lying between the base member 1 and the leg of the T-shaped clutch control lever 4. The clutch control lever 4 is pivotally mounted, at the intersection of the cross-arm and the leg of the T, on a second horizontal shaft 6 for rotational movement parallel to the base member 1. The second shaft 6 is secured to the base member 1, the axis of both the first horizontal shaft 3 and the second horizontal shaft 6 intersecting the center line of the elongated dimension of the base member 1. The clutch control lever 4 is provided with a vertical slot 7 the lower end of which opens into a bell-shaped cam opening 8, that extends almost to the lower edge of the leg of the lever 4. A third horizontal shaft 9 is secured to the upper end of the combined control lever 2 and extends through the slot 7 in clutch control lever 4. The shaft 9 is provided with a bushing 10 which contacts the upper edge of the slot 7 when the mechanism is in the clutch disengaged or neutral position illustrated in Figure 1. A primary valve control lever 11 is positioned forward of and parallel to the leg of the T-shaped clutch control lever 4 and is of approximately the same length as the leg of the T. The lower end of the primary valve control lever 11 is pivotally mounted on a horizontal stud 12, for rotational movement parallel to the secondary control lever 4. The stud 12 is secured to the clutch control lever 4, between the lower edge of the lever and the bottom of the bell-shaped opening 8. The primary valve control lever 11 is provided with a vertical slot 13, aligned horizontally with the slot 7 in the clutch control lever 4. The slot 13 extends into a bell-shaped cam opening 14 aligned horizontally with the bell-shaped cam opening 8 in the clutch control lever 4. The slot 13 is of the same length as the slot 7 but is narrower than the slot 7, as shown in Figure 2 of the accompanying drawings, while the bell-shaped cam openings 8 and 14 are of the same size. The bushing 10 on the shaft 9 extends through the slot 13 as well as through the slot 7.

A T-shaped secondary valve control lever 16 is positioned parallel to and forward of the T-shaped clutch control lever 4. The valve control lever 16 is pivotally secured at the intersection of the cross-arm and leg of the T to the second horizontal shaft 6 for rotational movement parallel to the clutch control lever 4. The leg of the T-shaped secondary valve control lever 16 is positioned between the primary valve lever 11 and the clutch control lever 4, the leg being considerably shorter than the primary valve control lever 4 but underlying it for a short distance. A second horizontal stud 17 is secured in the lower portion of the leg of the secondary valve control lever 16 and extends through the upper end of the primary valve control lever 11 which is pivotally mounted on the second stud 17.

The control mechanism of the present invention is provided with two power boosters 18 and 19 which are appropriately secured at 21 and 22 respectively, to the upper end of the vertical base member 1. Each power booster 18 and 19 is provided with a main cylindrical body 23 from which extends a hollow actuator arm 24. The actuator arm 24 and the cylinder 23 are coaxial, the arm 24 being capable of movement parallel to its axis either toward or away from the cylinder 23.

The power boosters 18 and 19 are further provided with valve rods 26 which extend from a valve mounted internally of the holow actuator arm 24 through the arm 24 to a point between two parallel arms of a yoke 27 in which the end of the arm 24 away from the cylinder 23 is terminated. The power boosters 18 and 19 are of the type in which the arm 24 is retracted in response to movement of the valve rod 26 toward the cylinder 23 and is extended in response to movement of the valve rod 26 away from the cylinder 23. The cylinders 18 and 19 are vacuum operated units, the vacuum being derived from the internal combustion engine of the marine propulsion system. Power boosters of this type are commercially available and, therefore, the details of the operating mechanism are not illustrated or described. An example of such a booster unit is the power booster employed in the Chevrolet automobile from 1939 to 1947 in the Vacuumatic Shift mechanism.

The coupling of the various levers to the power booster system will be described with respect to only one of the boosters 18 and 19 since the coupling to both of these units is identical. The end of the valve rod 26 away from the cylinder 23 is terminated in a flat coupling member 28 which has a rectangular cross section in all planes. The coupling member 28 is provided with a rectangular aperture 29 lying in a plane parallel to the base member 1 and extending through the member 28 along an axis perpendicular to the axis of the elongated dimension of base member 1. The cross-arm of the T-shaped secondary valve control lever 16 and the coupling member 28 of the valve lever 26 intersect between front and rear tongues 31 and 32 of the yoke 27, the end of the cross-arm of the valve control lever 16 being positioned in the aperture 29 in the coupling member 28. The aperture 29 is of such a size that a snug fit is obtained between the upper and lower edges of the aperture 29 and the upper and lower edges of the cross-arm of lever 16. As a result of this method of coupling, movement of the end of the cross-arm of the lever 16 parallel to the axis of the actuator arm 24 is imparted to the valve rod 26 while movement of the cross arm of the lever 16 perpendicular to the axis of the actuator arm 24 is not imparted to the valve rod 26. Both the end of the cross-arm of lever 16 and the coupling member 28 are provided with horizontally aligned, generally elliptic cylindrical apertures 35 whose generatrices are coaxial and perpendicular to the front surface of the base member 1. The major axes of the ellipses are parallel to the axis of the arm 24.

The cross-arm of the clutch control lever 4 is terminated in a yoke 34, the front and rear tongues of the yoke 34 being disposed to the front and rear, respectively, of the tongue 32 of the yoke 27 on the actuator arm 24. Each of the tongues of the yokes 27 and 34 are provided with cylindrical apertures 36, all of which are in horizontal alignment with the elliptic cylindrical apertures 35. A shaft 37 extends through all of these apertures and through an aperture 38a in one end of a first link 38. The other end of the link 38 is pivotally mounted on one end of a second link 39, which is perpendicular to the elongated axis of the base member 1. The other end of the second link 39 is fixed to the first shaft 3 behind the base member 1. The shaft 3 extends either directly or through a suitable coupling to the clutch control mechanism of the marine propulsion system. The particular arrangement employed for coupling the levers 4 and 16 to the arm 24 and valve rod 26, respectively, is only exemplary and it is not intended to limit the invention to the particular arrangement described.

The system of the present invention as described with reference to the accompanying drawings employs two power boosters 18 and 19. However, it is to be understood that it is not intended to limit the invention to the utilization of two such power boosters since in some installations a single power booster may supply sufficient power for rapid operation of the clutch mechanism.

The throttle control mechanism of the present invention comprises a base plate 41 secured to the upper surface of the primary valve control lever 11 between the stud 17 and the slot 13. A plate 42, perpendicular to the plate 41, extends outwardly from the left edge of the plate 41. A flat generally triangular-shaped secondary throttle control lever 43 is positioned to the right of as seen in Figure 1 and parallel to the plate 42 and is pivotally secured at a first of its apexes to a fourth horizontal shaft 44 for rotational movement parallel to the plate 42. The fourth shaft 44 is secured to the forward end of the plate 42. The triangular throttle control lever 43 extends vertically upward and forward from the shaft 44 and terminates at a point generally forward of the axis of the cross-arm of T-shaped secondary valve control lever 16. A long cylindrical throttle control rod 46 extends through an axially aligned cylindrical aperture 47 in the second horizontal shaft 6, and is enlarged at its forward end. A compression spring 48 is disposed about the throttle control rod 46 between the enlarged portion thereof, and the forward end of the second shaft 6. The throttle control rod 46 is pivotally attached at its enlarged forward end to a stud 49 which is secured to the throttle control lever 43 at its upper end. The other end of the throttle control rod 46 is connected to a throttle valve in the fuel control mechanism (not illustrated) of the prime mover.

A primary throttle control lever 51 is positioned forward of and parallel to the primary valve control lever 11 and extends from the stud 17 to a point about halfway between the third horizontal shaft 9 and the stud 12 in the lower end of the primary valve control lever 11. The upper end of the primary throttle control lever 51 is pivotally coupled to one end of a stud 52 by means of a ball and socket joint, the other end of the stud 52 being secured to the secondary throttle control lever 43 at its third apex. The lower section of the primary throttle control lever 51 is provided with a slot 53 approximately horizontally aligned with the slot 13 in the primary valve control lever 11. The upper end of the slot 53 is contacted by a bushing 54 positioned about the third horizontal shaft 9 which extends through the slot 53, as well as the slots 7 and 13 in the levers 4 and 11, respectively. The slot 53 extends almost to the lower edge of the primary throttle control lever 43.

The mechanism of the present invention as illustrated in Figure 1 is in the neutral position with the clutch of the propulsion system disengaged and the prime mover idling. When it is desired to engage the clutch, the lower end of the combined control lever 2 is rotated either clockwise or counterclockwise depending upon whether ahead or astern movement of the boat is desired. For the sake of explanation it is assumed that the lower end of the combined control lever 2 is rotated counterclockwise as illustrated in Figure 2. Upon rotation of the lever 2 counterclockwise about the shaft 3, the bushing 10 disposed about the third horizontal shaft 9 contacts the left edge of the slot 13 in the primary valve control lever 11, and rotates the lever 11 counterclockwise about the stud 12 on the clutch control lever 4. Since the slot 7 in the clutch control lever 4 is wider than the slot 13 in lever 11, the bushing 10 does not initially engage the lever 4 which, therefore, remains stationary. Counterclockwise rotation of the lever 11 applies a force to the stud 17 which produces clockwise rotation of the secondary valve control lever 16 about the horizontal shaft 6. Clockwise rotation of the lever 16 exerts a downward pull on the valve rod 26 of the power booster 19 and an upward push on the valve rod 26 of the power booster 18. As a result of the elliptical apertures in the levers 16 and 24 these levers are free to move with respect to the bolts 37 which pass through these apertures and, therefore, actuation of these levers does not exert a force on the bolts 37 or through them to the clutch control lever 4, the actuator arm 24 or the link 38. However, movement of the valve levers 26 actuates the power boosters 18 and 19 and the booster 18 retracts its associated actuator arm 24 and the booster 19 extends its associated actuator arm. The degree of rotation of the levers 11 and 16 necessary to actuate the boosters 18 and 19 is chosen such that the boosters are actuated before the bushing 10 on the shaft 9 contacts the edge of the slot 7 in the lever 4. As a result the only force the human operator must apply to the system is that necessary to move the valve rods 26. The movement of the arms 24 in response to actuation of the valve rods 26 is transmitted through the bolts 37 to the clutch control lever 4 and through this lever to the combined control lever 2, after the lost motion between the lever 4 and the bolt 9, provided by the wide slot 7 in the lever 4, is taken up. Movement of the actuator arms 24 is also transmitted through the bolt 37 to the link 38 which is pushed downwardly. Downward movement of the link 38 rotates the link 39 clockwise and since the link 39 is fixed to the horizontal shaft 3, the shaft 3 is also rotated clockwise. Clockwise rotation of the shaft 3 engages the clutch of the propulsion system for movement of the boat.

At this point in the operation of the system, illustrated in Figure 3 of the accompanying drawings, the bushing 10 disposed about the bolt 9 is seated against the upper left sides of the bell-shaped apertures 8 and 13 in the levers 4 and 11, respectively. Also the bushing 54, disposed about the forward end of the bolt 9, is in contact with the lower edge of the slot 53 in the primary throttle control lever 51. The arc of the bell-shaped apertures 8 and 13 is struck from the axis of rotation of the combined control lever 2 when the levers 4 and 11 are in the position shown in Figure 3 so that further movement of the shaft 9, as a result of continued rotation of the composition shown in Figure 3 so that further movement of either of the levers 4 and 11 but does maintain them in the position illustrated in Figure 3. Further rotation of the lever 2 does cause the shaft 9 to exert a downward pull on the primary throttle control lever 51 which is transmitted through the stud 52 to the secondary throttle control lever 43. As a result the lever 43 is rotated clockwise about the shaft 44 and pushes the throttle control rod 46 rearwardly against the force of the spring 47. Rearward movement of the throttle control rod 46 operates the fuel control mechanism of the prime mover to produce acceleration thereof.

When it is desired to decelerate the boat and disengage the clutch, the lever 2 is rotated clockwise. The compression spring 47 disposed about the throttle control rod 46 causes the lower edge of the slot 53 in the lever 51 to remain in contact with the bushing 54 until the throttle mechanism is returned to its neutral position and the prime mover is at idling speed. At this point the bushing 10 is just entering the slots 7 and 13 in the levers 4 and 11, respectively. Upon continued rotation of the lever 2, the bushing 10 contacts the right side of the slot 13 and rotates the lever 11 clockwise about the shaft 12. The lever 16 is rotated counterclockwise and returns the valve rods 26 to their neutral positions, which effects return of the actuator arms 24 to their neutral positions. As a result the shaft 3 is rotated counterclockwise and the clutch is disengaged and the levers 4, 11 and 16 are returned to the positions shown in Figure 1.

It is apparent from the above that in the event of failure of the power boosters 18 and 19 the clutch control system may be operated through the lever 4 by the human operator. If the boosters fail to operate after the operator has rotated the combined control lever 2 through an arc normally sufficient to actuate the boosters 18 and 19 continued rotation of the lever 2 brings the bushings 10 on the shaft 9 into engagement with the left side of the slot 7 in the lever 4 and thereafter force applied to the lever 2 is applied directly to lever 4. As a result the lever 4 is rotated clockwise about shaft 5 and applies force through the bolt 37 to the link 38.

The above description of the operation of the mechanism of the present invention is based on an initial counterclockwise rotation of the lever 2. It is apparent that upon clockwise rotation of the lever 2 the direction of rotation of each of the levers 4, 11, and 16 is reversed with respect to their directions of rotation as set forth above and the booster 18 extends its arm 24 while the booster 19 retracts its arm 24. The link 38 is pulled upward and as a result the shaft 3 is rotated counterclockwise. However, the operation of the throttle control levers remains the same in either case since the shaft 9 always exerts a downward pull on the primary throttle control lever 51. The ball and socket coupling between the lever 51 and the stud 52 is employed to allow the lever 51 to follow the shaft 9 to either side of the base member 1.

It is obvious that the mechanism of the present invention attains its stated object in that there is provided a single combined throttle and clutch control mechanism incorporating the advantages of both direct acting and remote control systems and which eliminates the disadvantages of both systems.

While I have described and illustrated one specific embodiment of the present invention, it will be clear that variations of the specific details of construction may be resorted to without departing from the true spirit and scope of the invention as defined in the appended claims.

What I claim is:

1. In a combined control mechanism for a reversing clutch and a throttle valve, a clutch shaft, a combined control lever having a neutral position, a clutch control linkage coupled to said clutch shaft for producing rotation of said clutch shaft, means also coupling said clutch linkage to said combined control lever through a first lost motion coupling, at least one power booster having a valve control for actuating said power booster, means for connecting said power booster to said clutch linkage to actuate said clutch linkage, a valve linkage connected between said combined lever and said valve control, said valve linkage operating said valve control to actuate said power booster upon a movement of said combined lever from its neutral position by an amount less than that necessary to take up the lost motion in said first lost motion coupling, a throttle control member for controlling the throttle valve, a throttle linkage connected to said throttle lever for effecting movement thereof, a second lost motion coupling connected between said combined control lever and said throttle linkage, the lost motion in said second lost motion coupling being such that said combined control lever engages said throttle linkage only after said clutch linkage has been actuated.

2. The combination in accordance with claim 1, wherein said first lost motion coupling comprises a slotted member included in said clutch linkage, a slotted member included in said valve linkage, and a shaft carried by said combined control lever and positioned in the slots in both of said slotted members, the slot in the clutch linkage member being larger than the slot in the valve linkage member in the direction of movement of said shaft.

3. The combination in accordance with claim 1, wherein said second lost motion coupling comprises a slotted member included in said throttle linkage, a shaft carried by said combined control lever and positioned in the slot in said slotted member and means for positioning said shaft at one end of the slot when said combined control lever is in its neutral position and for causing said shaft to engage the other end of the slot when said clutch shaft has been actuated.

4. In a combined control mechanism for a reversing clutch and a throttle valve comprising a clutch shaft for actuating said reversing clutch, a throttle control member for actuating said throttle valve, a clutch linkage for rotating said clutch shaft in either direction, a power booster for actuating said clutch linkage, a valve lever for controlling energization of said power booster, a valve linkage connected to said valve lever, a throttle linkage connected to said throttle control member, a combined control lever pivotally mounted for rotation to either side of a central line and a connection between said combined control lever and said throttle linkage, said valve linkage and said clutch linkage comprising, a slotted member included in each of said linkages, a shaft carried by said combined control lever and extending through the slots in all of said slotted members, said slotted members associated with said clutch and said valve linkages being pivoted about axes parallel to the pivotal axis of said combined control lever and arranged along the central line, the slots in all of said slotted members extending along said center line and the slots in said slotted members associated with said clutch and valve linkages extending into an enlarged opening, the slot in the clutch linkage member being wider than the slot in the valve linkage member in the direction of movement of said shaft.

5. The combination in accordance with claim 4, wherein said slotted member associated with said throttle linkage is pivotally secured to said throttle linkage for movement in two degrees of freedom and wherein the slot in the slotted throttle linkage member is terminated adjacent the opening of the slots of the other of said slotted members into said enlarged portions.

6. In combination, a clutch shaft, a plurality of interconnected links for rotating said clutch shaft, a power booster connected to actuate said links to rotate said clutch shaft, a valve lever for energizing said power booster, a T-shaped member having a leg and a cross-arm and pivoted at the intersection of said leg and said cross-arm, means coupling one end of said cross-arm to said interconnected links at the point of connection of said power booster to said interconnected links, said leg of said T-shaped member having a first aperture elongated along the longitudinal axis of said leg, one end of said aperture extending into a first enlarged opening, a pivotally mounted combined control lever having a neutral position in line with said leg of said T-shaped member, a shaft secured to said combined control lever and extending through said aperture in said leg, a valve linkage for actuating said valve lever and including a valve control lever positioned parallel to said T-shaped member and adjacent to said leg, said valve control lever having a second elongated aperture adjacent to said first elongated aperture, said second elongated aperture extending into a second enlarged opening adjacent said first enlarged opening, said shaft also extending through said second aperture, said first aperture being wider than said second aperture, and means pivotally securing said valve control lever to said leg of said T-shaped member for rotational movement parallel to said T-shaped member.

7. The combination in accordance with claim 6, wherein there is provided a throttle control member, a throttle linkage for actuating said throttle control member and including a throttle control lever positioned parallel to said valve control lever, said throttle control lever having a third elongated aperture adjacent said second elongated aperture and said throttle control lever being pivotally secured to said throttle linkage for movement about one end in a plane parallel to said valve control lever.

8. A combined control mechanism for a reversing clutch and a prime mover comprising a clutch shaft movable in either of two directions, a combined control member having a neutral position, a clutch control linkage coupled to said clutch shaft for producing movement thereof in either of said two directions in response to movement of said combined control members in either of two directions, a first lost motion mechanism, means coupling said clutch linkage to said combined control member through said first lost motion mechanism, at least one power booster, power booster control means for actuating said power booster, means connecting said power booster to said clutch linkage to actuate said clutch linkage, a booster control linkage connected between said combined control lever and said control means, said booster control linkage operating said booster control means to actuate said power booster upon movement of said combined control member from its neutral position by an amount less than that necessary to take up the lost motion in said first lost motion mechanism, a prime mover control mechanism, a prime mover control linkage connected to the prime mover power control mechanism for actuation thereof, a second lost motion coupling connected between said combined control member and prime mover control linkage, the lost motion of said second lost motion coupling being such that said combined control member engages said throttle linkage only upon movement of said combined control lever from its neutral position by an amount necessary to take up the lost motion in said first lost motion mechanism.

References Cited in the file of this patent

UNITED STATES PATENTS

| 1,963,444 | Mullins | June 19, 1934 |
| 2,426,064 | Stevens | Aug. 19, 1947 |
| 2,444,273 | Stevens | June 29, 1948 |